July 2, 1968 KUNIO A. SUMIDA 3,390,898
QUICK RELEASE THREADED COUPLING
Filed March 22, 1965 2 Sheets-Sheet 1
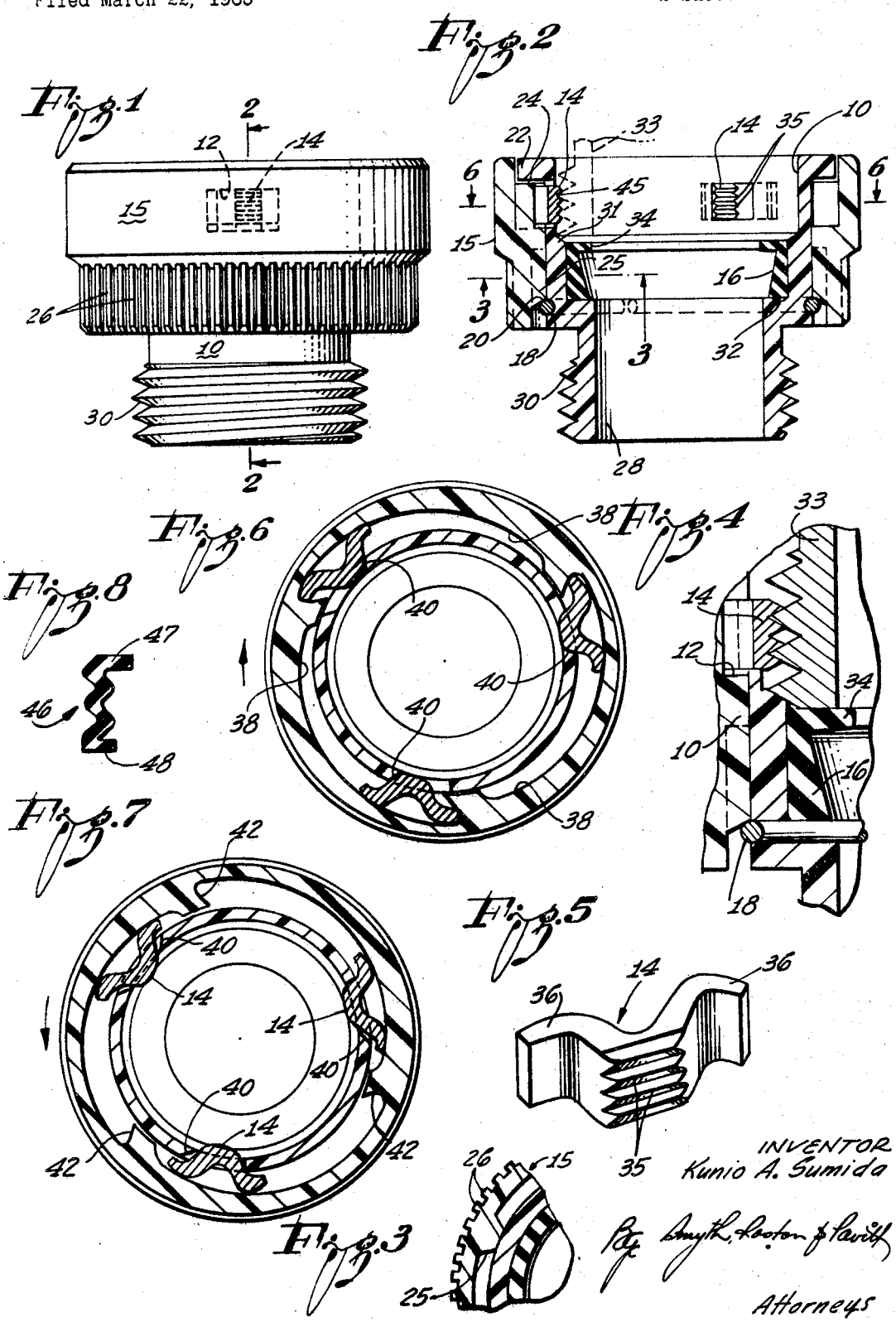
INVENTOR
Kunio A. Sumida
Attorneys July 2, 1968  KUNIO A. SUMIDA  3,390,898
QUICK RELEASE THREADED COUPLING
Filed March 22, 1965  2 Sheets-Sheet 2
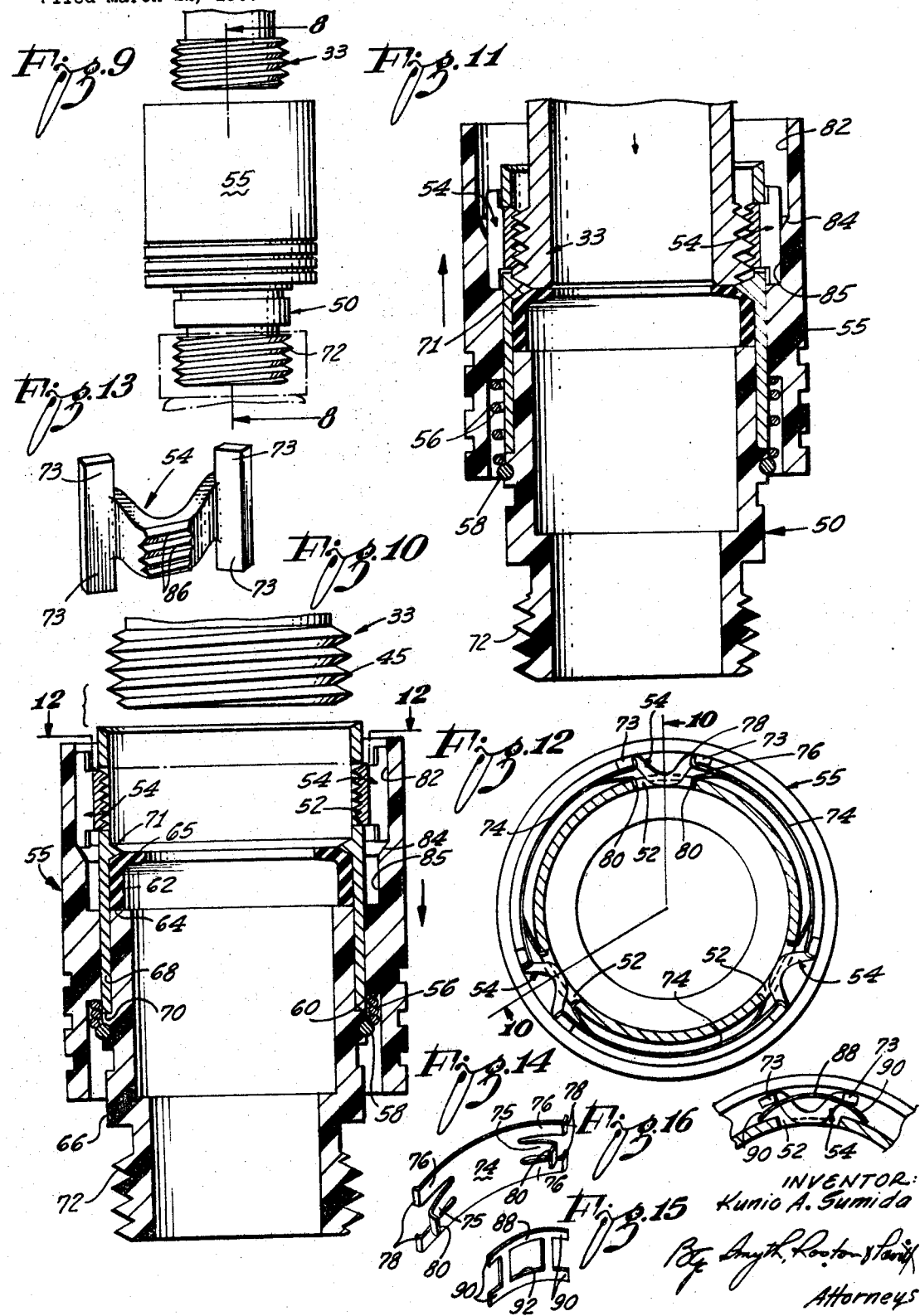
INVENTOR:
Kunio A. Sumida
By Smyth, Roston & Pavitt
Attorneys United States Patent Office 3,390,898
Patented July 2, 1968

3,390,898
QUICK RELEASE THREADED COUPLING
Kunio A. Sumida, 1114 N. Kenter Ave.,
Los Angeles, Calif. 90049
Filed Mar. 22, 1965, Ser. No. 441,689
3 Claims. (Cl. 285—34)

ABSTRACT OF THE DISCLOSURE

A coupling for connecting a hose to a threaded nipple portion of a faucet has an inner cylindrical member to telescope over the nipple portion with jaws movable through windows in the inner member into engagement with the thread of the nipple portion, the coupling having an outer cylindrical member that is movable relative to the inner cylindrical member to cam the jaws inwardly to their effective positions. Special springs may be employed to urge the jaws inwardly. The windows are oversized to provide freedom for movement of the jaws axially of the nipple portion and the jaws have fine teeth to engage the coarser screw thread of the nipple portion. Annular sealing means to abut the nose of the nipple portion may be bodily slidable against the nose of the nipple portion or may be expansile in length against the nose of the nipple portion or may have a radially inward flange that has full freedom for flexure against the nose of the nipple portion.

---

This invention relates to a coupling for quickly and conveniently connecting and disconnecting two members without the necessity of rotating a pair of screw threads into mutual engagement. More particularly the invention relates to a single female coupling adapted for releasably engaging outer circumferential ridges of a cooperating male member, which ridges may be simple circumferential ribs or teeth or may be turns of a male screw thread.

The coupling is widely applicable for its purpose but has special utility for use on the end of a garden hose to releasably connect the hose to a faucet having a male screw thread or to releasably connect the hose to a screw threaded end of a pipe or nipple. Such an embodiment of a hose coupler is described herein by way of example and will provide adequate guidance for those skilled in the art who may have occasion to utilize the same principles in couplings for other specific purposes.

The prevailing type of quick-disconnect garden hose coupling comprises a male coupling fitting adapted to be screwed onto a faucet and a cooperating female coupling fitting adapted to be screwed onto the end of a hose. The present invention eliminates the need for the male coupling fitting by providing a female coupling fitting capable of direct engagement with a screw threaded faucet.

For its purpose, the female coupling has a plurality of circumferentially spaced jaws or latch members that are movable from outwardly retracted release positions to radially inward effective positions in engagement with the male thread of a faucet and suitable manually operable cam means is provided to actuate and lock the jaws or latch members. The basic problem to which the invention is directed is to embody this concept in a coupling structure that is both simple and inexpensive but at the same time is both rugged and efficient.

Broadly described, this basic problem is solved by mounting a plurality of latch members in a corresponding plurality of circumferentially spaced openings in an inner cylindrical member and by encircling the inner member with an outer cylindrical member which holds the latch members captive and which is movable relative to the inner member to actuate the latch members by cam action.

An important advantage of such a construction is that the two cylindrical members may be inexpensive plastic parts produced by injection molding and the latch members may be simple metal parts adapted for mass production at relatively low cost. In addition the assembly procedure may consist simply of placing the latch members in position at the openings in the inner cylindrical member, telescoping the outer cylindrical member over the inner cylindrical member and then installing a snap ring on one of the two members to keep the two members together.

Within the scope of the invention the relative movement between the two cylindrical members for cam action of the latch members may be either rotary or longitudinal. Also within the scope of the invention, spring means may be provided to bias the latch members or instead, both the inward and outward movement of the latch members may be controlled solely by cam action. Furthermore with the outer cylindrical member movable relative to the inner member to a limit position to lock the latch members in their effective positions, spring means acting between the two members may be provided to urge the outer cylindrical member to the limit position or instead the cam means for actuating the latch may be shaped for frictional retention of the outer member at the limit position.

In a first embodiment of the invention described herein the relative movement between the two cylindrical members is rotary as distinguished from axial. An important advantage of rotational relative movement is that such a female coupling fitting may be compact in axial dimension. When a coupling fitting is placed under stress by lateral force exerted by a hose attached thereto, the length of the resultant moment arm is determined by the length of the coupling fitting and the shorter the coupling fitting the less the likelihood of structural damage to the fitting. Another advantage of a coupling with relatively rotatable parts instead of axially movable parts is that a faucet that is engaged by the coupling does not interfere with the relative rotation whereas a faucet may interfere with relative axial movement.

A further feature of the first embodiment of the invention is the complete absence of springs, cam action being provided for movement of the latch members in both directions between their retracted positions and their effective positions.

In a second embodiment of the invention relative axial movement in one direction between the two cylindrical members forces the latch members radially inward to their effective positions by cam action and spring means provides force for the relative movement in this direction. At the limit of this relative movement in the one direction, the jaws are held at their inner effective positions by a cylindrical surface as distinguished from a cam surface and are thus positively locked at their positions of engagement with a faucet or the like. When the two cylindrical members are retracted relative to each other in opposition to the spring means, second spring means in the form of leaf springs retracts the latch members to their release positions.

In both embodiments of the invention the latch members are floating latch members in the sense that the latch members have a limited range of freedom for longitudinal movement. For this purpose the apertures in the inner cylindrical member in which the latch members are mounted are of greater length or dimension in the axial direction than the latch members. This arrangement permits the latch members to adjust themselves quickly to the screw threads of a faucet. In this regard a further feature of the invention is that the spacing of the serrations or teeth of the latch members are substantially less than the pitch of the screw thread of a faucet, preferably about half of the pitch, to reduce the amount of axial movement of a latch member that is necessary for the latch member to engage the faucet.

The features and advantages of the invention may be understood from the following detailed description of the invention and the accompanying drawings.

In the drawings which are to be regarded as merely illustrative:

FIG. 1 is a side elevation of the first embodiment of the invention;

FIG. 2 is a longitudinal section taken along the line 2—2 of FIG. 1;

FIG. 3 is a fragmentary transverse section taken along the line 3—3 of FIG. 2;

FIG. 4 is an enlarged fragmentary section similar to FIG. 2;

FIG. 5 is a perspective view of a latch member employed in the first embodiment of the invention;

FIG. 6 is a transverse sectional view taken as indicated by the line 6—6 of FIG. 2 showing the latch members in their outer retracted positions;

FIG. 7 is a view similar to FIG. 6 showing the latch members locked in their radially inward effective positions;

FIG. 8 is a radial sectional view of a sealing member that may be substituted for the sealing member in the first embodiment of the invention;

FIG. 9 is a side elevational view of a second embodiment of the invention;

FIG. 10 is an enlarged longitudinal sectional view taken as indicated by the angular line 10—10 of FIG. 13 and showing the latch members in their outer retracted positions;

FIG. 11 is a similar view showing the latch members in their radially inward effective positions in engagement with the screw thread of a faucet;

FIG. 12 is a transverse sectional view taken along the angular line 12—12 of FIG. 10;

FIG. 13 is a perspective view of a latch member employed in the second embodiment of the invention;

FIG. 14 is a perspective view of one of three leaf springs employed in the second embodiment of the invention;

FIG. 15 is a perspective view of an alternate form of leaf spring that may be employed in the second embodiment of the invention; and FIG. 16 is a fragmentary sectional view showing how the leaf spring shown in FIG. 15 may be incorporated in the second embodiment of the invention.

The parts of the first embodiment of the invention shown in FIGS. 1 to 7 are: an inner cylindrical member 10 having a plurality of circumferentially spaced apertures or windows 12; a corresponding plurality of latch members or jaws 14 mounted in the apertures 12 respectively; an outer cylindrical member 15 embracing the inner cylindrical member 10 to keep the latch members captive; and an elastomeric annular sealing member 16 positioned inside the inner cylindrical member.

The outer cylindrical member 15 is rotatable relative to the inner cylindrical member 10 and suitable provision is made to hold the two cylindrical members against axial separation. In the construction shown relative axial movement between the two cylindrical members in one direction is prevented by a snap ring 18 seated in a circumferential groove of the inner cylindrical member in abutment with an inner shoulder 20 of the outer cylindrical member and relative axial movement in the opposite direction is prevented by an outer radial flange 22 of the inner cylindrical member abutting an inner circumferential shoulder 24 of the outer cylindrical member.

As indicated in FIG. 3, the outer cylindrical member 15 may be formed with short longitudinal ribs 25 and as may be seen in FIG. 2 the lower ends of the longitudinal ribs 25 form the inner shoulder 20 that is engaged by the snap ring 18. Preferably the outer cylindrical member 15 is further formed with longitudinal serrations 26 to facilitate manual rotation of the outer cylindrical member relative to the inner cylindrical member.

The inner cylindrical member 10 has an end portion which is formed with an external screw thread 30 to permit the coupling fitting to be screwed onto a conventional female threaded fitting at one end of a hose. The annular sealing member 16 is mounted inside the inner cylindrical member 10 adjacent a tapered shoulder 31 and is backed against an inner circumferential shoulder 32 of the inner cylindrical member. The tapered shoulder 31 is intended to abut the rim of a faucet 33 and to center the coupling relative to the faucet, as may be seen in FIGS. 2 and 4. The annular sealing member 16 is formed with an inner radial lip 34 for sealing action against the end of the faucet and it is important to note that the annular sealing member 16 is free to move axially outward into contact with the end of a faucet in the event the rim of the faucet is spaced from the tapered shoulder 31.

As best shown in FIG. 5, each of the latch members 14 has a central portion formed with teeth or serrations 35 for engagement with the male thread of a faucet and each of the latch members is further formed with a pair of opposite wings 36 which limit the extent to which the latch members may be shifted radially inwardly through the apertures or windows 12 in the inner cylindrical member 10.

For cooperation with the three latch members 14, respectively, the outer cylindrical member 15 is formed with three eccentric cam surfaces 38 which extend in circumferential directions. When the outer cylindrical member 15 is rotated counterclockwise relative to the inner cylindrical member from the position shown in FIG. 6 to the position shown in FIG. 7, each of the eccentric cam surfaces 38 is effective to force the corresponding latch member 14 radially inwardly. FIG. 7 shows how the outer cylindrical member 15 is rotated to a point limited by the wedging of each of the latch members 14 between the corresponding cam surface 38 and the two opposite edges of the corresponding window 12. It may be seen in FIG. 7 that the eccentricity or effective slope of the cam surface 38 is relatively small with the result that the wedging of the latch members between the two cylindrical members creates adequate frictional resistance to prevent loosening relative rotation of the two cylindrical members. In other words the eccentricity or effective slope of each of the cam surfaces 38 is so small that when the latch members are forced radially inwardly as shown in FIG. 7, the outward pressure of the latch members against the eccentric cam surface does not result in any tendency for reverse relative rotation of the outer cylindrical member. It is also to be noted that the low slope of the cam surfaces 36 provides a mechanical advantage in their outward actuation of the latch members.

When the outer cylindrical member 15 is rotated clockwise from the locking position shown in FIG. 7 to the release position shown in FIG. 6, an inclined side edge 40 of each of the windows 12 presses against a corresponding inclined surface of the corresponding latch member 14 in the manner shown in FIG. 6 whereby the inclined side edge serves as a cam to urge the latch member radially outward against the corresponding cam surface 38. Thus each latch member 14 is forced radially outward by cam action against the corresponding cam surface 38 and at the same time is forced to slide along the inclined cam surface to retract the latch member.

This release clockwise relative rotation of the outer cylindrical member 15 is limited by abutment of a wing 35 of each latch member against a corresponding shoulder 42 on the inner surface of the outer cylindrical member as indicated in FIG. 6. It is to be noted in FIG. 6 that each of the shoulders 42 is sloped to overhang the contacting wing 35 of the corresponding latch member 14. Thus at the limit of release rotation of the outer cylindrical member 15, each latch member 14 is cammed radially outwardly initially by the inclined side edge 40 of the corresponding window 12 and by the inclined surface of the overhanging shoulder 42. It is apparent that at this limit position each latch member is held retracted in a positive manner.

The manner in which the first embodiment of the invention functions for its purpose may be readily understood from the foregoing description. With the outer cylindrical member 15 rotated to its release position shown in FIG. 6 for maximum retraction of the three latch members 14, the female coupling is telescoped over the end of the faucet 33 that is shown in phantom in FIG. 2 and is shown in full lines in FIG. 4. The outer cylindrical member 15 is then rotated from the position shown in FIG. 6 to the position shown in FIG. 7 to drive the three latch members 14 radially inward into engagement with the external screw thread 45 of the faucet.

By virtue of the fact that each of the latch members 14 is held captive in a floating manner, each latch member is free to adjust itself for positive engagement with the turns of the screw thread 45. FIGS. 2 and 4 show the teeth or serrations 35 of a latch member 14 in positive engagement with the turns of the screw thread 45.

FIG. 4 also shows how the lip 34 of the annular sealing member 16 makes contact with the annular end of the faucet. It is apparent that the internal fluid pressure exerted on the sealing ring 16 has the effect of pressing the lip 34 against the end of the faucet for highly effective sealing action. If the faucet 33 stops short of the position shown in FIG. 4, the annular sealing member 16 is free to slide bodily axially into sealing engagement with the faucet and does so in response to the internal fluid pressure.

To release the coupling fitting of the faucet it is merely necessary to reverse the rotation of the outer cylindrical member 15 from the position shown in FIG. 7 to the position shown in FIG. 6 thereby to retract the three latch members 14 to their outer release positions.

FIG. 8 shows an annular sealing member 46 which may be substituted for the annular sealing member 16 in the first embodiment of the invention. The annular sealing member 46 is formed with the usual radially inward sealing lip 47 and at its base end is formed with an inner radial flange 48 which, if desired, may be adhesively bonded to the inner circumferential shoulder 32 of the inner cylindrical member 10. The annular sealing member 46 is of corrugated construction, as shown, to make the sealing member longitudinally expansible. When the sealing member 46 is used it tends to extend longitudinally in response to the internal fluid pressure and thereby seeks sealing contact with the end of the faucet 33 even when the faucet is retracted relative to the tapered shoulder 31.

The parts of the second embodiment of the invention shown in FIGS. 9 to 16 include: an inner cylindrical member 50 with circumferentially spaced apertures or windows 52 therein; a plurality of latch or jaw members 54 in the corresponding apertures or windows; an outer cylindrical member 55 slidingly embracing the inner cylindrical member 50 and confining the plurality of latch members 54; a coil spring 56 that acts in compression between a snap ring 58 and a shoulder 60 of the outer cylindrical member to urge the outer member longitudinally towards its effective position shown in FIG. 11; and an annular sealing member 62 that is mounted inside the inner cylindrical member 50 against an inner circumferential shoulder 64, the annular sealing member having an inwardly turned sealing flange or lip 65.

In the construction shown, the inner cylindrical member 50 is made in two sections comprising a plastic section 66 and a thin walled metal section 68 that is telescoped over the plastic section and is bonded thereto in abutment with an external shoulder 70 of the plastic section. The metal section 68 forms the windows 52 and additionally forms a tapered inner circumferential shoulder 71 which overhangs and confines the annular sealing member 62. The plastic section 66 is formed with an external screw thread 72 whereby the coupling may be screwed into a conventional female connector on the end of a hose.

The latch members 54 are of the same general character as the previously described latch members 14, but each latch member 54 is additionally formed with four corner lugs 73.

FIG. 12 shows how a set of three leaf springs 74 may be employed to bias the latch members 54 radially outwardly towards their retracted positions. As may be seen in FIG. 14, each spring member 74 is longitudinally curved and is formed at each end with three flexible fingers compressing a central finger 75 straddled by two fingers 76. Each of the straddling fingers 76 at each end of the leaf spring 74 is formed with an outwardly directed end flange 78 and the central finger 75 at each end of the leaf spring is formed with a radially inwardly extending end flange 80.

When the second embodiment of the invention is fully assembled, each of the leaf springs 74 extends between two of the latch members 54 as shown in FIG. 12 with the end flanges 80 at each end of the leaf spring engaging an edge of two windows 52 and with the two end flanges 78 at each end of the leaf spring 74 engaging a pair of the corner lugs 73 of a latch member 54. Thus the three leaf springs 74 not only bias the three latch members 54 radially outwardly but also keeps the three latch members centered with respect to the three corresponding windows 52.

The outlying cylindrical member 55 is formed with an inner cylindrical surface 82 against which the three latch members 54 are pressed by the three leaf springs 74 at the release position of the outer cylindrical member as shown in FIG. 10. The outer cylindrical member 55 is further formed with a conical cam surface 84 which inclines radially inwardly from the inner cylindrical surface 82 to a second inner cylindrical surface 85 of lesser diameter which confines the latch members 54 in a positive manner at their inner effective positions as shown in FIG. 11.

Normally when the coupling of the second embodiment of the invention is disengaged from a faucet, the outer cylindrical member 55 is held at its forward locking position by the coil spring 56, the parts of the coupling being positioned as shown in FIG. 11. In prepration for engaging the coupling with a faucet 33 having an external screw thread 45, the outer cylindrical member 55 is manually retracted to the position shown in FIG. 10 to bring the inner cylindrical surface 82 of the outer cylindrical member into the zone of the three latch members 54 to permit the three latch members to be retracted by the leaf springs 74 to their radially outward release positions.

The coupling is then telescoped over the threaded end of the faucet 33 with the tapered shoulder 71 of the coupling cooperating with the faucet to center the coupling and then the outer cylindrical member 55 is manually released to be returned by the coil spring 56 to its normal locking position shown in FIG. 11. The spring actuated return of the outer cylindrical member 55 to its locking position causes the conical cam surface 84 of the outer cylindrical member to cam the latch members 54 radially inward in opposition to the leaf springs 74 and then causes the inner cylindrical surface 85 to confine the latch members in a positive manner at their inner effective positions in engagement with the turns of the screw thread 45. Here again the latch members 54 are formed with relatively closely spaced teeth or serrations 86 for engagement with the relatively widely spaced turns of the screw thread 45 and here again the windows 52 are larger than the corresponding portions of the latch members 54 as measured axially of the coupling whereby the latch members are free to shift as required for quick engagement with the turns of the male screw thread.

FIG. 15 shows a leaf spring 88, three of which may be substituted for the three leaf springs 74 in the second embodiment of the invention. The leaf spring 84 is longitudinally curved and is formed with four end fingers 90 and a central rectangular aperture 92. As shown in FIG. 16 each of the leaf springs 88 spans a window 52 of the inner cylindrical member 50 and is arched outward against the four corner lugs 73 of the corresponding latch member 54. Thus the three leaf springs 88 urge the three latch members radially outward against the confining circumferential wall of the outer cylindrical member 55.

My description in specific detail of the selected embodiments of the invention will suggest various changes, substitutions and other departures from my disclosure within the spirit and scope of the appended claims.

I claim:

1. In a coupling for connection to a tubular male member having outer circumferential ridges, the combination of:

an inner member having a circumferential wall dimensioned to telescope over the male member, said circumferential wall having a plurality of circumferentially spaced openings therein;

a corresponding plurality of latch members protruding inwardly into said openings respectively;

an outer member surrounding the inner member and cooperating with the inner member to hold the latch members captive with freedom for the latch members to advance radially inwardly into engagement with the circumferential ridges of the male member and to retract radially outward to clear the circumferential ridges, said outer member being movable relative to the inner member;

cam means carried by the outer member to force the latch members radially inward in response to movement of the outer member relative to the inner member;

said inner member having an inner shoulder to serve as stop means for abutment with the rim of the male member; and an annular elastomeric sealing member inside the inner member and inside the inside diameter of said inner shoulder to make sealing contact with the leading end of the male member, said annular sealing member being free for body movement axially outward beyond said inner shoulder to make sealing contact with the leading end of the male member when said leading end is spaced axially away from the inner shoulder.

2. A combination as set forth in claim 1 in which said annular sealing means is expansile in length in response to fluid pressure inside the coupling.

3. A combination as set forth in claim 2 in which said annular sealing means is of corrugated configuration for axial expansion and contraction.

References Cited

UNITED STATES PATENTS

| | | | |
|---|---|---|---|
| 592,899 | 11/1897 | Wilson | 285—317 |
| 798,441 | 8/1905 | Nelson | 285—110 |
| 1,029,819 | 6/1912 | Nylander | 285—314 X |
| 1,211,387 | 1/1917 | Beck | 285—34 |
| 1,500,531 | 7/1924 | Schweinert et al. | 285—34 |
| 2,170,574 | 8/1939 | Sauzedde | 285—109 X |
| 2,361,827 | 10/1944 | Dowell | 285—314 |
| 2,463,179 | 3/1949 | Iftiger | 285—34 |
| 2,708,589 | 5/1955 | Masek | 285—315 X |
| 3,075,792 | 1/1963 | Franck. | |

FOREIGN PATENTS 801,867    1/1951    Germany.

EDWARD C. ALLEN, *Primary Examiner.*

CARL W. TOMLIN, *Examiner.*

R. G. BERKLEY, *Assistant Examiner.*